US011762397B2

(12) United States Patent
Cheon et al.

(10) Patent No.: US 11,762,397 B2
(45) Date of Patent: Sep. 19, 2023

(54) AUTONOMOUS DRIVING CART

(71) Applicant: TWINNY Co., Ltd., Daejeon (KR)

(72) Inventors: Hongseok Cheon, Daejeon (KR);
Taehyoung Kim, Daejeon (KR);
Yongjin Byeon, Daejeon (KR); Jaihoon Lee, Daejeon (KR); Ayoung Kwon, Daejeon (KR); Chan Lee, Gumi-si (KR); Hanmin Jo, Daejeon (KR); Yonghwi Kim, Seoul (KR); Jaesung Kim, Daejeon (KR)

(73) Assignee: TWINNY CO., LTD., Daejeon (KR)

( * ) Notice: Subject to any disclaimer, the term of this patent is extended or adjusted under 35 U.S.C. 154(b) by 485 days.

(21) Appl. No.: 16/679,368

(22) Filed: Nov. 11, 2019

(65) Prior Publication Data
US 2020/0174497 A1   Jun. 4, 2020

(30) Foreign Application Priority Data
Nov. 29, 2018   (KR) ................. 10-2018-0151197

(51) Int. Cl.
*G05D 1/02*   (2020.01)
*G05D 1/00*   (2006.01)
*B62B 5/00*   (2006.01)

(52) U.S. Cl.
CPC ......... *G05D 1/0295* (2013.01); *G05D 1/0061* (2013.01); *G05D 1/0088* (2013.01); *G05D 1/0212* (2013.01); *B62B 5/0069* (2013.01)

(58) Field of Classification Search
CPC .. G05D 1/0295; G05D 1/0061; G05D 1/0088; G05D 1/0212; G05D 2201/0211; G05D 1/0246; G05D 1/12; G05D 1/0289; B62B 5/0069
See application file for complete search history.

(56) References Cited

U.S. PATENT DOCUMENTS

| 10,919,555 | B1* | 2/2021 | Spruill | B62B 5/0046 |
| 11,209,887 | B1* | 12/2021 | Jung | G05D 1/0255 |
| 11,372,408 | B1* | 6/2022 | Webster | G05D 1/0094 |
| 2015/0094879 | A1* | 4/2015 | Pari | B25J 11/008 701/2 |
| 2017/0203446 | A1* | 7/2017 | Dooley | H04N 23/63 |
| 2017/0220040 | A1* | 8/2017 | London | A45C 9/00 |
| 2019/0008248 | A1* | 1/2019 | Kovtun | G05D 1/0088 |

(Continued)

FOREIGN PATENT DOCUMENTS

| KR | 10-1079197 | 10/2011 |
| KR | 10-2012-0060064 | 6/2012 |

(Continued)

OTHER PUBLICATIONS

Machine transtion for KR20120060064A, Rheem Jae, Jun. 2012.*

(Continued)

*Primary Examiner* — Faris S Almatrahi
*Assistant Examiner* — Abdalla A Khaled
(74) *Attorney, Agent, or Firm* — Panitch Schwarze Belisario & Nadel LLP (57) ABSTRACT

The present invention relates to an autonomous driving cart. More particularly, the present invention relates to an autonomous driving cart that stores information on a leading subject, detects the leading subject from sensed information, and follows the detected leading subject.

6 Claims, 7 Drawing Sheets

(56) References Cited

U.S. PATENT DOCUMENTS

2019/0077007 A1\* 3/2019 Mallinson ............. A61B 5/1118
2019/0302775 A1\* 10/2019 Palan ........................ B62B 5/02
2021/0039265 A1\* 2/2021 Nam ...................... B25J 9/1682

FOREIGN PATENT DOCUMENTS

| KR | 20120060064 A | \* | 6/2012 |
| KR | 10-2015-0126096 | | 11/2015 |
| KR | 10-1709683 | | 2/2017 |
| KR | 10-2017-0131958 | | 12/2017 |
| KR | 10-1840700 | | 3/2018 |
| KR | 10-2018-0083569 | | 7/2018 |
| KR | 10-1877488 | | 7/2018 |
| KR | 10-2018-0109107 | | 10/2018 |
| KR | 20180109107 A | \* | 10/2018 |

OTHER PUBLICATIONS

Machine translation KR2018010910, Ba Young, Oct. 2018.\*
Online Bidirectional Trajectory Planning for Mobile Robots in State-Time Space (IEEE Transactions on Industrial Electronics, Date of Publication: Aug. 24, 2018).

\* cited by examiner

AUTONOMOUS DRIVING CART

CROSS REFERENCE TO RELATED APPLICATION

The present application claims priority to Korean Patent Application No. 10-2018-0151197, filed Nov. 29, 2018, the entire contents of which is incorporated herein for all purposes by this reference.

TECHNICAL FIELD

The present invention relates to an autonomous driving cart. More particularly, the present invention relates to an autonomous driving cart that stores information on a leading subject, detects the leading subject by using sensed information, and follows the detected leading subject.

BACKGROUND

Shopping carts were carts used when shopping.

Shopping carts are first invented in the United States, and normally include seats behind the handle where one or more children can sit.

Recently, large-scale discount stores are in various places as the people purchase goods on large discount stores in these days. Shopping carts are mainly used in large discount stores or shopping malls to carry goods that consumers have selected for purchase.

Meanwhile, a shopping cart provided in a large-sized shopping mall includes a loading unit capable of storing a large number of articles, a frame supporting the loading unit, wheels enabling a user to easily move the heavy shopping cart loaded with a large number of articles, and a handle for controlling the shopping cart.

However, when the shopping cart becomes heavy due to a large number of articles, controlling the shopping cart can be difficult causing collision with other persons, changing directions of the cart can be difficult, or sometimes safety accidents occur when the shopping cart rolls down on a ramp.

In addition, people such as the disabled or the elderly can have difficulty in shopping by using a shopping cart.

Korean Patent No. 10-1709683 discloses a user oriented autonomous driving shopping cart system using a non-contact user interface, and a method of controlling an autonomous driving shopping cart.

The foregoing is intended merely to aid in the understanding of the background of the present invention, and is not intended to mean that the present invention falls within the purview of the related art that is already known to those skilled in the art.

SUMMARY

Accordingly, the present invention has been made keeping in mind the above problems occurring in the related art, an objective of the present invention is to provide an autonomous driving cart, wherein the autonomous driving cart follows a leading subject (user) where the leading subject does not carry an additional device by storing information on the leading subject, detects the leading subject by using sensed information, and follows the detected leading subject.

Technical tasks obtainable from the present invention are not limited the above-mentioned technical task, and other unmentioned technical tasks can be clearly understood from the following description by those having ordinary skill in the technical field to which the present invention pertains.

In order to achieve the above object, according to one aspect of the present invention, there is provided an autonomous driving cart, the cart including: a storage unit 100 for storing goods; a driving unit 200 configured with a motor and wheels for driving, and coupled to the storage unit 100; a sensor unit 300 obtaining information on a surrounding environment; a leading subject storage unit 400 for storing information on a leading subject; a leading subject recognition unit 500 detecting the leading subject on the basis of information sensed by the sensor unit 300, and information on the leading subject stored in the leading subject storage unit 400; and a control unit 600 controlling the driving unit 200 to follow the leading subject detected by the leading subject recognition unit 500.

In addition, the sensor unit 300 may include any one or a plurality of devices selected from a depth camera, a camera, an ultrasonic sensor, a vision sensor, and a distance sensor.

In addition, the leading subject storage unit 400 may store information on the leading subject on the basis of any one or a plurality of pieces of information selected from a color, a size, and a shape.

In addition, the control unit 600 may include: an environment recognition unit 610 recognizing an environment including obstacles on the basis of information obtained from the sensor unit 300; a trajectory planning unit 620 planning a movement trajectory to follow the leading subject detected in the leading subject recognition unit 500 while avoiding the obstacles recognized in the environment recognition unit 610; and a driving control unit 630 controlling the driving unit 200 according to the movement trajectory planned in the trajectory planning unit 620.

In addition, the control unit 600 may control the driving unit 200 to follow the leading subject when a distance with the leading subject is greater than a specific distance, and to stop moving when the distance with the leading subject is equal to or smaller than the specific distance.

In addition, the control unit 600 may control the driving unit 200 such that a direction of the sensor unit 300 turns toward the leading subject by turning the sensor unit 300 at a stopped location when the distance with the leading subject is equal to or smaller than the specific distance.

In addition, the sensor unit 300 may include a sensor turning unit 310 turning the sensor unit 300, and the control unit 600 may control a direction of the sensor unit 300 by turning the sensor turning unit 310 such that the leading subject exists within a predetermined range within a detection range of the sensor unit 300.

In addition, the sensor unit 300 may include a sensor turning unit 310 turning the sensor unit 300, and the control unit 600 may control the driving unit 200 such that the direction of the sensor unit 300 turns towards the leading subject by turning the sensor unit 300 at a stopped location when the distance with the leading subject is equal to or smaller than the specific distance, wherein the controller 600 may control the sensor turning unit 310 such that the direction of the sensor unit 300 turns towards the leading subject when the leading subject is expected to be out of a detection range of the sensing unit 300.

In addition, the autonomous driving cart may further include: a manipulation unit 700 receiving manipulation information from a user, wherein the control unit 600 may store (recognize) information on the leading subject, follows the leading subject, and stops moving the cart according to the manipulation information input to the manipulation unit 700.

In addition, the control unit 600 may switch a driving mode according to the manipulation information input to the manipulation unit 700.

According to an autonomous driving cart according to an embodiment of the present invention, a leading subject (user) can use the autonomous driving cart conveniently without carrying an additional device as the autonomous driving cart detects a leading subject by using sensed information, and follows the detected leading subject.

In addition, the leading subject can be detected in real time by detecting the leading subject on the basis of information on a color, a size, and a shape which are obtained by using a depth camera, a camera, an ultrasonic sensor, a vision sensor, and a distance sensor.

In addition, an obstacle avoiding movement trajectory based on environment recognition including obstacles can be provided by providing an environment recognition unit, a trajectory planning unit, and a driving control unit to a control unit.

In addition, the user can easily insert and remove goods into/from the cart by controlling the cart to stop moving when a distance with the leading subject is equal to or smaller than a specific distance.

In addition, the sensor unit can continuously monitor the leading subject by turning the front surface of the cart toward the leading subject at a stopping location when a distance with the leading subject is equal to or smaller than a specific distance.

In addition, the sensor unit can continuously monitor the leading subject even in an unexpected movement of the leading subject by providing a sensor turning unit.

In addition, the user can perform various desired manipulations by providing a manipulation unit.

In addition, the autonomous driving cart can be provided to satisfy a user's intention by providing various driving modes.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

The present invention can be modified in various manners and have various forms. Therefore, specific embodiments will be described in detail with reference to the accompanying drawings. However, the present invention is not limited to the specific embodiments, but may include all modifications, equivalents and substitutions within the scope of the present invention.

It will be understood that when an element is referred to as being "connected" or "coupled" to another element, it can be directly connected or coupled to the other element or intervening elements may be present.

In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises", "comprising", "includes", and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Herein, with reference to the accompanying drawings, embodiments of the present invention will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. In addition, technical terms and scientific terms used in the present specification have the general meaning understood by those skilled in the art to which the present invention pertains unless otherwise defined, and a description for the known function and configuration obscuring the present invention will be omitted in the following description and the accompanying drawings. The drawings to be provided below are provided by way of example so that the idea of the present invention can be sufficiently delivered to a person skilled in the art to which the present invention pertains. Therefore, the present invention is not limited to the drawings provided below but may be modified in many different forms. In addition, like reference numerals designate like elements throughout the specification. In the drawings, same reference numerals denote same components throughout the disclosure.

Figure 1:
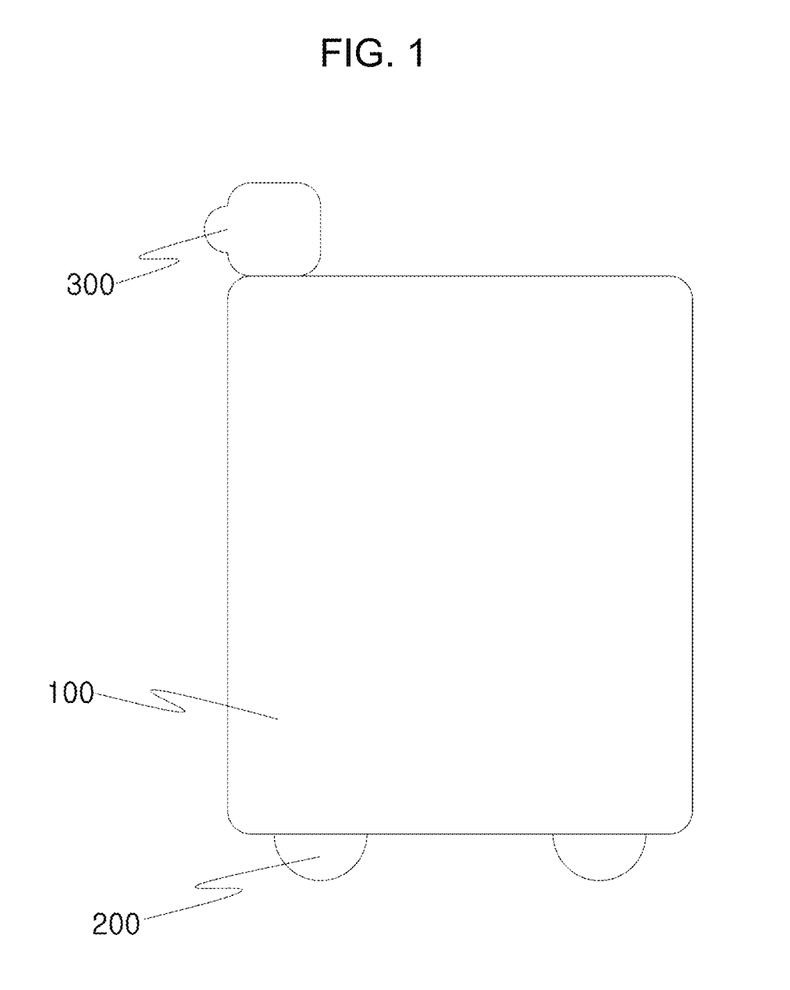
FIGS. 1 and 2 are views respectively showing a conceptual diagram of an autonomous driving cart according to an embodiment of the present invention.
Figure 2:
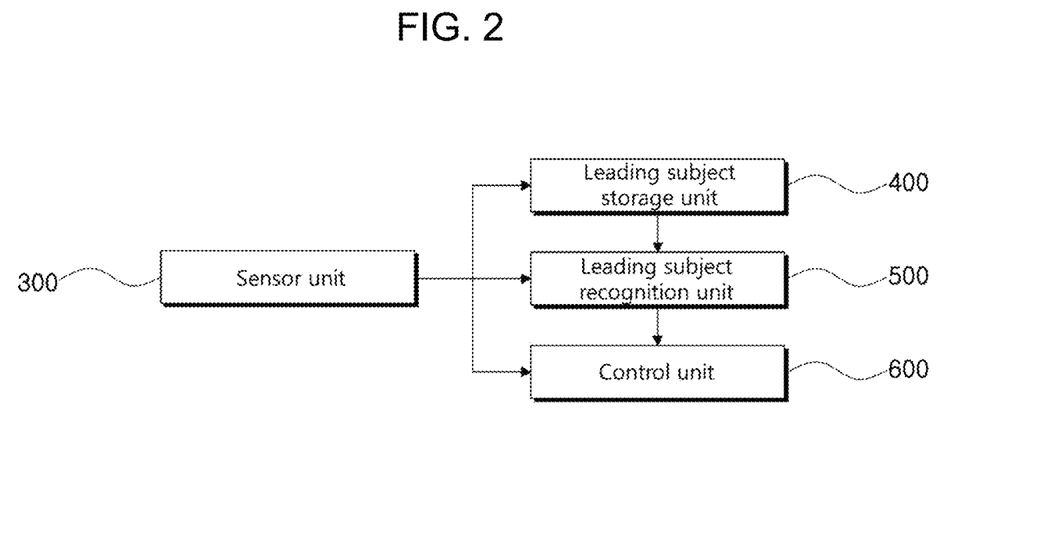
Figure 3:
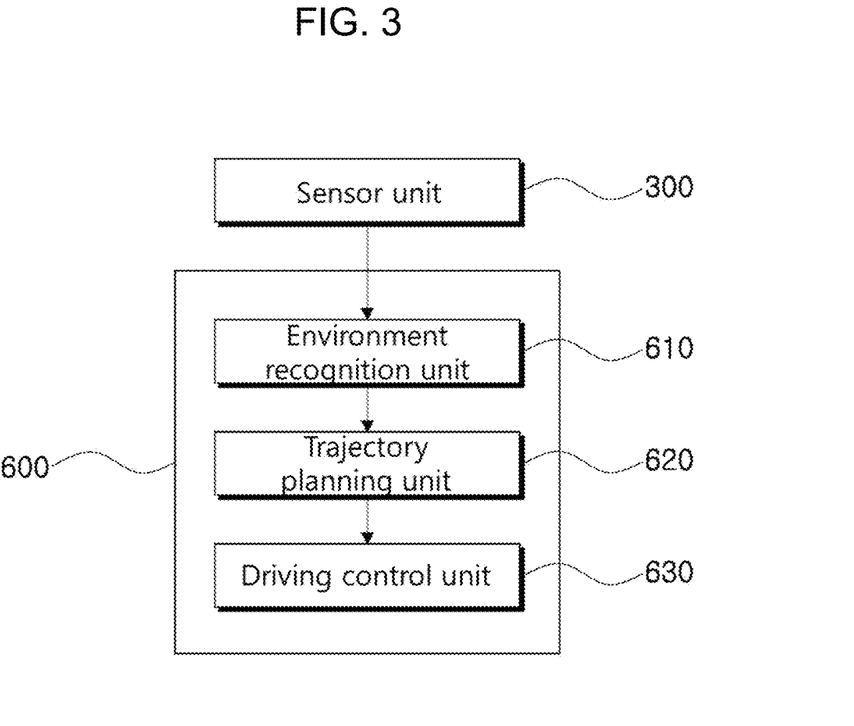
FIG. 3 is a view showing a conceptual diagram in detail of a control unit of FIG. 2.
Figure 4:
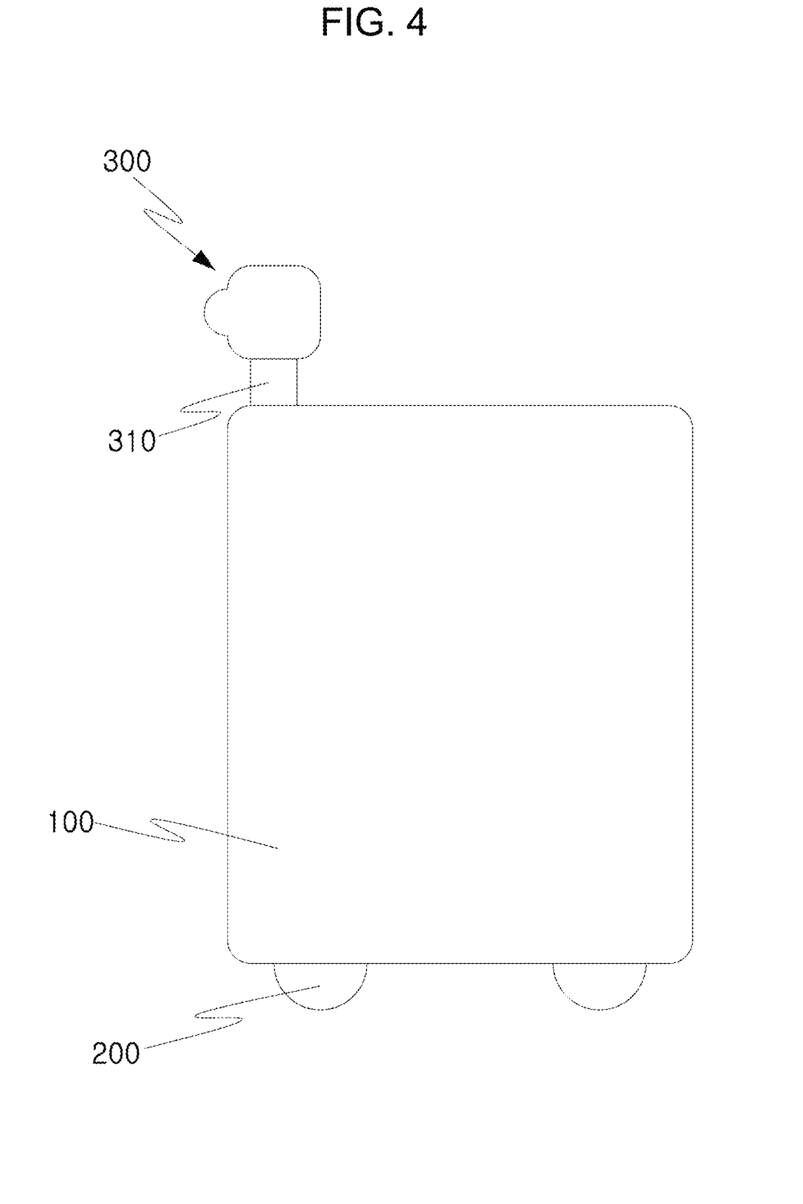
FIG. 4 is a view showing a conceptual diagram of an autonomous driving cart according to another embodiment of the present invention.
Figure 5:
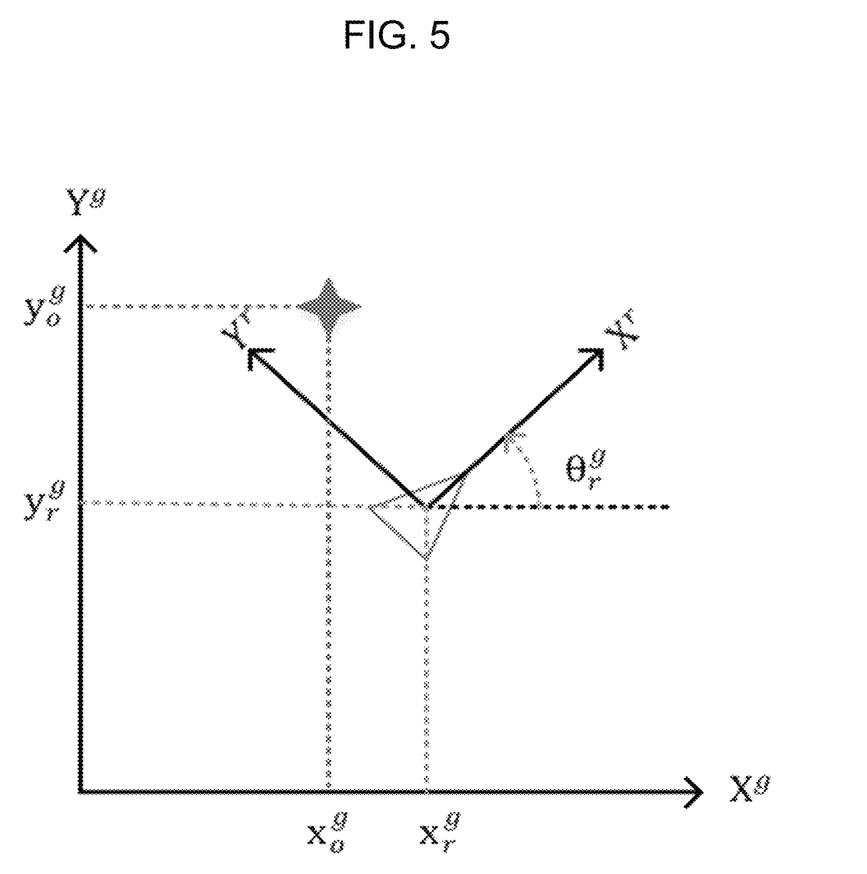
FIG. 5 is a view showing an example of a global coordinate system, a coordinate system of the autonomous driving cart, and an estimated user location.
Figure 6:
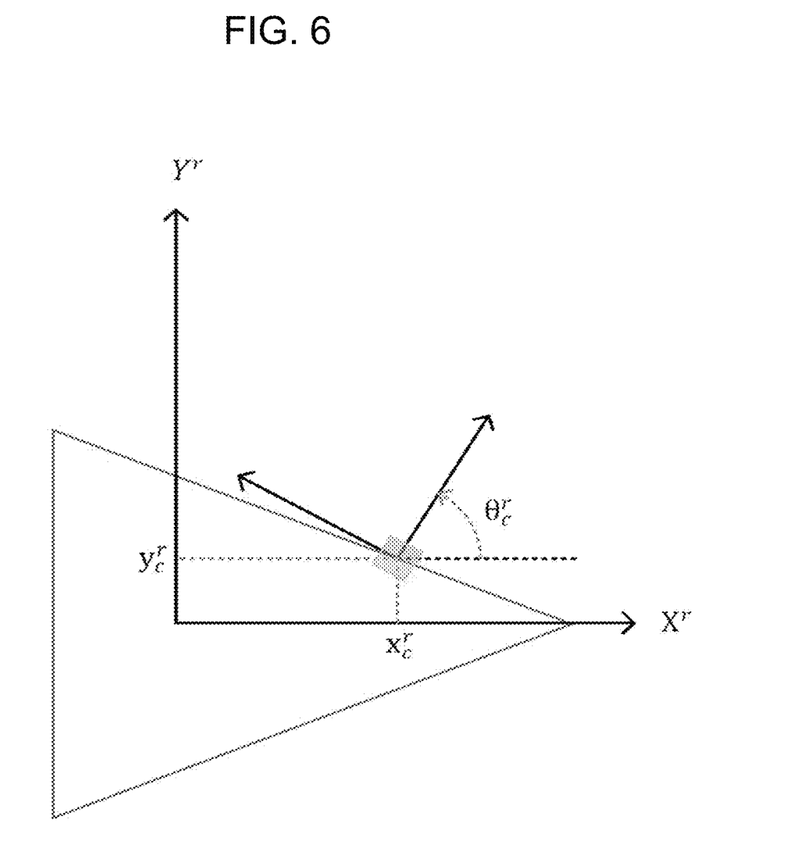
FIG. 6 is a view showing an example of the coordinate system of the autonomous driving cart and a coordinate system of a sensor unit.
Figure 7:
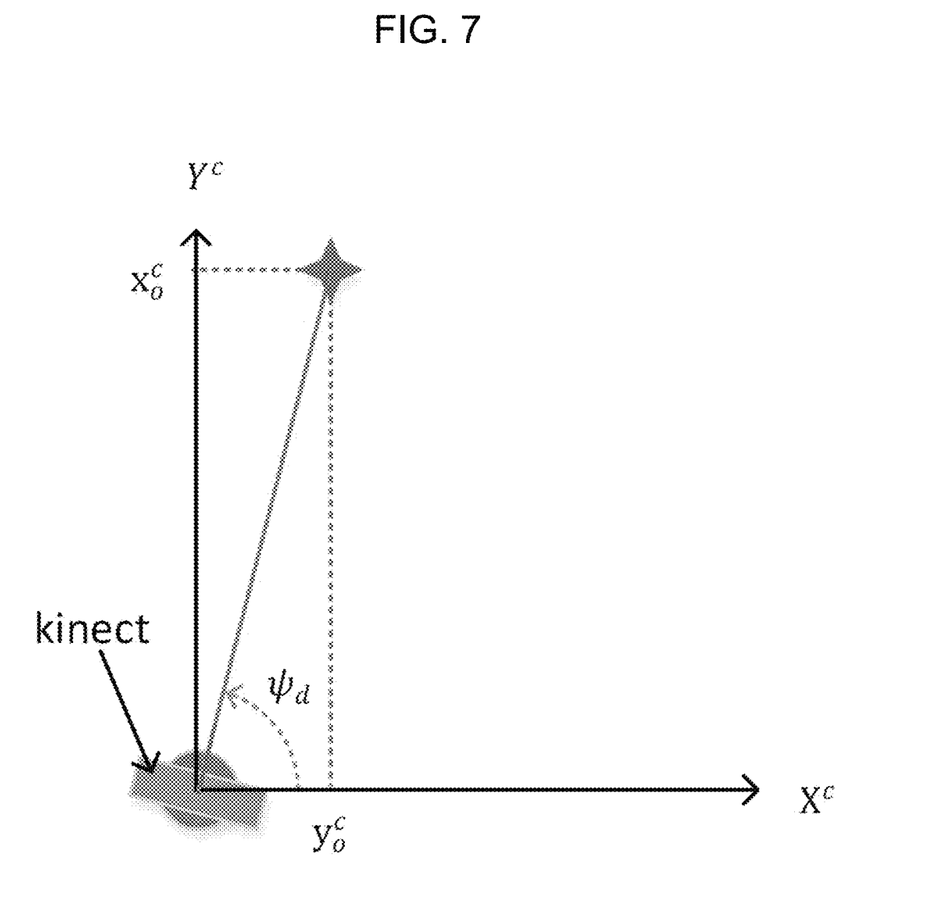
FIG. 7 is a view showing an example of the coordinate system of the sensor unit and a target turning angle.
Figure 8:
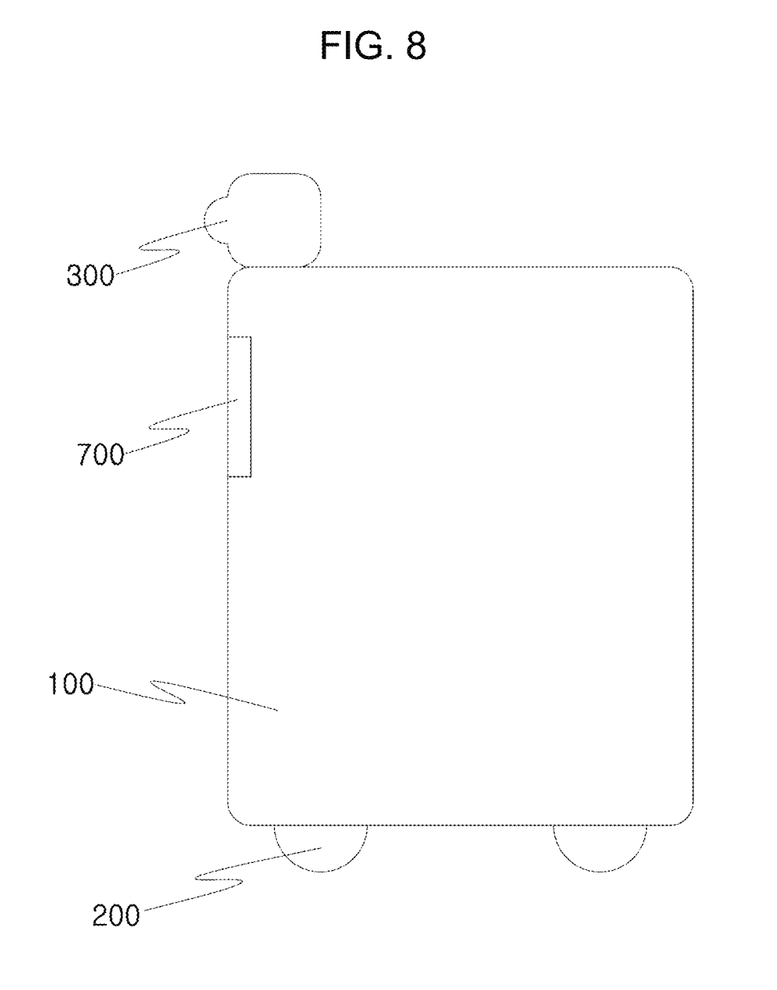
FIG. 8 is a view showing a conceptual diagram of an autonomous driving cart according to another embodiment of the present invention.

FIGS. 1 and 2 are views respectively showing a conceptual diagram of an autonomous driving cart according to an embodiment of the present invention, FIG. 3 is a view showing a conceptual diagram in detail of a control unit of FIG. 2, FIG. 4 is a view showing a conceptual diagram of an autonomous driving cart according to another embodiment of the present invention, FIG. 5 is a view showing an example of a global coordinate system, a cart coordinate system, and an estimated user location, FIG. 6 is a view showing an example of a cart coordinate system and a sensor unit coordinate system, FIG. 7 is a view showing an example of an sensor unit coordinate system and a target turning angle, and FIG. 8 is a view showing a conceptual diagram of an autonomous driving cart according to another embodiment of the present invention.

As shown in FIGS. 1 and 2, an autonomous driving cart according to an embodiment of the present invention includes: a storage unit 100, a driving unit 200, a sensor unit 300, a leading subject storage unit 400, a leading subject recognition unit 500, and a control unit 600.

In the storage unit 100, goods are stored.

The storage unit 100 is used for storing objects that a user wants to purchase, and has a space for storing goods.

The driving unit 200 is configured with a motor and wheels for driving and coupled to the storage unit 100.

The driving unit 200 is for moving the storage unit 100, and is coupled to a lower part or lateral part of the storage unit, and includes wheels for moving the storage unit 100.

Wheels are round-shaped objects installed on a shaft for rotation purposes, but the present invention does not limit the shape of the wheel, various shapes can be applied such as a polygonal shape installed in the shaft for purpose of rotation.

In addition, the wheels may directly be in contact the floor to move the storage unit 100, but the storage unit 100 may move by rotating other components such as caterpillar or tracks.

In addition, the motor is a component for rotating the wheels, and may directly rotate the wheels. However, various structures may be applied to rotate the wheels such as indirectly rotating the wheels by using a gear, etc.

The sensor unit 300 obtains surrounding environmental information (environmental recognition and movement recognition).

The sensor unit 300 is for sensing obstacles and a leading subject, and may use a sensor for obtaining distance information, and various sensors for obtaining image information.

In the leading subject storage unit 400, information on a leading subject is stored.

The leading subject storage unit 400 is for storing information required for recognizing a leading subject, and may obtain information required for recognizing the leading subject through the sensor unit 300, and store the obtained information.

The leading subject recognition unit 500 detects a leading subject on the basis of (comparing) information sensed by the sensor unit 300 and information of the leading subject stored in the leading subject storage unit 400.

The leading subject recognition unit 500 recognizes a leading subject by using information on to the leading subject which is stored in the leading subject storage unit 400 among information sensed by the sensor unit 300.

The control unit 600 controls the driving unit 200 to follow a leading subject detected by the leading subject recognition unit 500.

The control unit 600 controls the autonomous driving cart according to an embodiment of the present invention (hereinafter, autonomous driving cart) to follow a leading subject, and preferably, to follow the leading subject without colliding therewith.

For the same, it is preferable to control the cart to follow by maintaining a predetermined distance. In an example, the following may be performed by maintaining a distance of 1 m.

In the above example, following may be performed by maintaining a distance of 1 m, but the present invention is not limited thereto. Various examples may be used when collision with a leading subject does not occur, such as distance of 0.5 m to 2 m, etc.

The sensor unit 300 of the autonomous driving cart according to an embodiment of the present invention includes any one or a plurality of devices selected from a depth camera, a camera, an ultrasonic sensor, a vision sensor, and a distance sensor.

The depth camera, the ultrasonic sensor, and the distance sensor may be used for obtaining information on a distance with a subject, the vision sensor may be used for obtaining information on an object and scene, and the camera may be used for obtaining image information.

The above sensors are examples that can be used for the sensor unit 300, but the present invention is not limited thereto. Various sensors which are capable of obtaining information on an environment such as obstacle, etc., and obtaining information on recognizing a leading subject may be applied.

For example, as a sensor used for the sensor unit 300, the depth camera capable of obtaining distance information, and the camera capable of obtaining colored image information may be used. The sensor unit 300 may also be used for detecting information on a leading subject which is to be stored in the leading subject storage unit 400.

In other words, the sensor unit 300 may be used for detecting information on a leading subject first, and for storing the detected information in the leading subject storage unit 400. Subsequently, the sensor unit 300 may be used for detecting a leading subject through the leading subject recognition unit 500.

The leading subject storage unit 400 of the autonomous driving cart according to an embodiment of the present invention is for storing information on a leading subject based on any one or a plurality of pieces of information selected from a color, a size, and a shape.

It is preferable for the leading subject storage unit 400 to store information on a feature capable of distinguishing a leading subject from another object (goods, people, etc.).

This is because a leading subject has to be recognized correctly so that the autonomous driving cart follows the correct leading subject.

However, when a large number of pieces of information is stored so as to improve accuracy, detecting in real time a leading subject can be difficult.

Accordingly, it is preferable to store information on a leading subject based on information capable of being obtained quickly while improving accuracy.

For the same, usable types of information include color information such as color ratio, color distribution, etc., size information such as area of a surface, height, etc., and shape information such as figures.

The size information or the shape information may be obtained by using the depth camera, and the color information may be obtained by using a color imaging camera.

As shown in FIG. 3, the control unit 600 of the autonomous driving cart according to an embodiment of the present invention includes an environment recognition unit 610, a trajectory planning unit 620, and a driving control unit 630.

The environment recognition unit 610 recognizes an environment including obstacles on the basis of information obtained from the sensor unit 300.

The environment recognition unit 610 may recognize an environment on static obstacles and dynamic obstacles. In other words, recognition may be performed for each object by classifying the same into a static obstacle that is not moving such as wall, and a dynamic obstacle that is movable such as people.

In order to classify into a static obstacle, checking may be performed by comparing with map information that is input in advance, and in order classify into a dynamic obstacle, checking may be performed by using information on whether or not motion information is detected.

Herein, the environment recognition unit 610 may recognize an environment by processing data obtained through the sensor unit 300. Data processing is used for reducing an amount of calculation.

The trajectory planning unit 620 plans a movement trajectory to follow a leading subject detected by the leading subject recognition unit 500 while avoiding obstacles recognized by the environment recognition unit 610.

Planning, by the trajectory planning unit 620, a movement trajectory to follow the leading subject while avoiding obstacles will be described in detail.

Prior to the description, terms used in the present specification (and claims) will be briefly described.

A "state-time space" refers to a set of state values taking into account of time.

A "state value" refers to a value including a location, and a configuration value of bearing (heading angle), and includes any one or a plurality of pieces of information selected from a steering angle, a velocity (linear velocity, angular velocity), and an acceleration. For example, the same may be (x coordinate, y coordinate, bearing, velocity, acceleration), etc.

A "timed configuration region" means a set of configuration values taking into account time.

A "configuration value" refers to a value including a location and a bearing (heading angle). For example, the same may be (x coordinate, y coordinate, bearing), etc.

A "waypoint" refers to a designated location trough which a robot passes when calculating a driving trajectory.

For the description, various parameters and terms are designated and described. The variables and terms are as below.

A state value of a current location of the robot is represented as "$s_k$".

A state value for an f step calculated in a forward trajectory from a current location of the robot is represented as "$s_f$".

A state value of the robot when the robot arrives a current target waypoint is represented as "$g_w$".

A state value calculated for a step b in a backward trajectory from the current target waypoint is represented as "$s_{-b}$".

A time index representing to which step corresponds the calculation is represented as "n".

A time interval given for calculating one step is represented as "T".

A time at a time index n is represented as "t" (t=nT).

A state value of the robot is represented as "s" (lowercase s).

A state space that is a set of state values of the robot is represented as "S" (capital letter S).

A timed state value that is a state value at a time step n is represented as $s_n$ (lowercase s).

A state-time space is represented as "$S_n$" ($s_n \in S_n$).

A configuration value of the robot is represented as "q" (lowercase q).

A configuration region that is a set of configuration values of the robot is represented as "Q" (capital letter Q).

A timed configuration value that is a configuration value at a time step n is represented as $q_n$ (lowercase q).

A timed configuration region is represented as "$Q_n$" ($q_n \in Q_n$).

A configuration region where collision with static obstacles exists is represented as $Q^{env}$.

A free static configuration region where collision with static obstacles is not present is represented as $Q^{free}$ ($Q^{free}=Q-Q^{env}$).

A configuration region where collision with dynamic obstacle exists at a time index n is represented as $Q_n^{obs}$.

A free dynamic configuration region where collision with static obstacles and dynamic obstacles is not present is represented as $Q_n^{free}$ ($Q_n^{free}=Q^{free}-Q_n^{obs}$).

A state where collision is inevitable is referred to as an "inevitable state".

Fundamental parameters and terms are summarized, but not all of the parameters and terms necessary for the description are listed. Parameters and terms that are used in addition to the parameters and terms defined above will be described later.

The trajectory planning unit 620 calculates a forward trajectory in a state-time space from a current location of a robot or a last calculation point of a previous forward trajectory to a current target waypoint by taking into account a state value s and a time value (time index n).

Herein, a state value $s_n$ in a state-time space which is used for a planning forward trajectory includes a configuration value of a location and a bearing (heading angle), and includes any one or a plurality of pieces of information selected from a steering angle, a velocity (linear velocity, angular velocity), and acceleration.

The forward trajectory is calculated on the basis of a safe timed configuration region $Q_n^{safe}(m)$ that is a safe region in a configuration region where collisions with static obstacles and dynamic obstacles are not present. When the safe timed configuration region $Q_n^{safe}(m)$ is not present so that collision is inevitable, it is determined that an inevitable collision state (ICS) occurs.

When the inevitable collision state occurs, a part of the planned forward trajectory is canceled, and a forward trajectory passing an interim target is planned so as to avoid the collision.

Herein, the time value is a value through which a future time from the current time is confirmed. For the same, a time index n may be used, but various methods may be used when an actual progress time can be confirmed such as multiplying a calculation period that calculates one step with a time index n (calculation period*time index n), etc.

In the forward trajectory calculation, a forward trajectory in a state-time space is calculated from an initial current location of the robot to a current target waypoint. Subsequently, a forward trajectory in a state-time space may be calculated from a last calculation point of the forward trajectory toward the current target waypoint.

In other words, a forward trajectory is sequentially calculated, and when an inevitable collision state occurs while planning the forward trajectory, a part of the forward trajectory that is planned (calculated) in the meantime is canceled, and an interim target capable of avoiding the inevitable collision state is set, and then a forward trajectory passing through the interim target is re-planned so as to avoid the collision.

Herein, whether or not the inevitable collision state (ICS) occurs may be determined by whether or not a safe timed configuration region $Q_n^{safe}(m)$ exists.

In the forward trajectory calculation, a cost-to-go function H is decomposed, and a priority r (r is a natural number) is assigned to the decomposed cost-to-go function $H^r$, and the decomposed cost-to-go functions (Hr) are sequentially applied to a near-optimal timed state function N according to a preset reference which calculates a trajectory where a value of summing the decomposed cost-to-go function $H^r$ becomes minimum (an r* value may be set or calculated).

Herein, a state value $s_{n+m}$ in a step where the number m of steps to be calculated is progressed from the given point of the state value $s_n$ toward the target point $s^{to}$ is calculated on the basis of a given state value $s_n$ in an n (n is natural number) step, a state value $s^{to}$ at a target point, and a number m of steps to be calculated.

When planning the state value $s_{n+m}$ including the given state value $s_n$, a cost-to-go from the state value $s_{n+m}$ to a point corresponding to the target state value $s^{to}$ is calculated to be minimum.

In other words, the forward trajectory calculation may be defined as below.

$$s_{n+m} = \underset{s \in S_n^{safe}}{\mathrm{argmin}} H(s, s^{to})$$

Herein, $s_{n+m}$ is a state value at a time n+m, H is a cost-to-go function, s is a given state value, $s^{to}$ is a state value at a target point, and m is a number of steps to be calculated.

When a cost-to-go function H is used, long time is required for calculation, and thus applying in real time to trajectory calculation is difficult.

An input value $u_n$ for the robot may be obtained as below.

$$u_n = \underset{u \in \overline{U}_n(m)}{\mathrm{argmin}} H_{Input}(s_n, s_{n+m})$$

$$\overline{U}_n(m) = \left\{ u \in U \mid s_{n+m} = g(s_n, u, m) \right\}$$

$$s_{n+m} = \underset{s \in S_n^{safe}(m)}{\mathrm{argmin}} H(s, s^{to}) \right\}$$

Herein, $H_{input}$ is a given cost cost-to-go function about input for the least effort.

The available input is always present since planning is performed for $s_{n+m}$ within a safe region that is bounded by the available input space of the available robot.

When the cost-to-go function for minimizing the cost-to-go is too complex to calculate a trajectory in real time, a function decomposition-based optimization method may be used.

A cost-to-go function H is decomposed, and a priority r (r is natural number) is assigned to the decomposed cost-to-go function $H^r$, and the decomposed cost-to-go functions $H^r$ are sequentially applied to a near-optimal timed state function N according to the priority (an r* value may be set or calculated) which calculates a trajectory where a value of summing the decomposed cost functions $H^r$ becomes minimum.

Herein, a state value $s_{n+m}$ in a step where the number m of steps to be calculated is progressed from the given point of the state value $s_n$ toward the target point $s^{to}$ is calculated on the basis of a state value $s_n$ given in an n step, a state value $s^{to}$ at a target point and a number m of steps to be calculated.

A function decomposition-based optimization method decomposes a function into simple parts, and minimizes a dominant part first. It is assumed that H is configured with R parts as below.

$$H = \sum_{r=1,2,\ldots,R} H^r$$

Herein $H^r$'s are arranged in order of dominance. In other words, $H^r$ with smaller r is more dominant. When minimizing is performed sequentially one by one from $H^1$ to $H^R$, an available safe region becomes smaller. The decomposed cost-to-go function $H^r$ is minimized by increasing the r value until a single state value is induced.

A safe timed state space $\hat{S}_n^r(m)$ that minimizes r parts from $H^1$ to $H^r$ may be defined as below.

$$\hat{S}_n^r(m) = \left\{ s \mid \underset{s \in \hat{S}_n^{r-1}(m)}{\mathrm{argmin}} (H^r(s, s^{to})) \right\}$$

A safe timed state space $\hat{S}_n^0(m)$ calculated by using a cost-to-go function that is not decomposed is identical to a safe timed state space $S_n^{safe}(m)$.

An r value from which one state value is induced is referred to as r*, and minimizing is performed for the decomposed cost-to-go function until r* is obtained. Herein, a usable safe timed state space is reduced to a single state as below.

$$\{s_{n+m}\} = \hat{S}_n^{r*}(m)$$

Herein, $$r^* = \min\{r \in \{1,2,\ldots,R\} \mid |\hat{S}_n^r(m)| = 1\}$$

Even though the timed state value obtained from function decomposition-based minimization does not minimize H, the result is close to minimum as dominant parts are minimized.

In addition, real time execution is available, and calculation is efficient.

Accordingly, when a near-optimal timed state function N is applied, the forward trajectory calculation may be performed as below.

$$S_{n+m} = N(S_n, S^{to}, m)$$

Herein, $s_{n+m}$ is a state value in an n+m step, N is a near-optimal timed state value calculation function, $s_n$ is a given state value in an n step, and $s^{to}$ is a state value at a target point, and m is a number of steps to be calculated.

In case of an omnidirectional movable robot, for example, the near-optimal timed state function N may be calculated by using the equation below.

$$H(s^{from}, s^{to}) = H^1 + H^2 + H^3$$

$$H^1 = \|p^{from} - p^{to}\|$$

$$H^2 = |\phi^{from} - \varphi| + |\phi^{to} - \varphi|$$

$$H^3 = \left| \frac{v^{from} D}{v_{max} \min(D, \|p^{from} - p^{to}\|)} - \frac{\pi - |\phi^{from} - \varphi|}{\pi} \right| +$$

$$\left| \frac{v^{to} D}{v_{max} \min(D, \|p^{from} - p^{to}\|)} - \frac{\pi - |\phi^{to} - \varphi|}{\pi} \right|$$

Herein, $H^1$ is a velocity-independent cost-to-go function, $H^2$ is a moving direction part cost-to-go function, and $H^3$ is a velocity magnitude part cost-to-go function.

In order to induce the robot to move toward the target fast and pass through waypoints effectively, a cost-to-go function $H(s^{from}, s^{to})$ is configured with three parts, and D is a predefined threshold distance.

Each location in a reachable region is matched 1:1 with an admissible velocity space, and thus each timed state is determined on the basis of the velocity-independent cost-to-go function $H^1$.

The moving direction part cost-to-go function $H^2$ and the velocity magnitude part cost-to-go function $H^3$ are used for setting a state of a current target waypoint.

On the basis of $H^1$, each timed configuration is determined to be the closest one to the target.

$H^2$ and $H^3$ are designed for setting a state of the current target waypoint.

A velocity at the current target waypoint is determined by taking account into a robot location, a location of a target waypoint, and a location of a subsequent waypoint.

A direction is determined as an average direction of two vectors which are from a robot location to a location of a target waypoint, and from a location of a waypoint to a location of a subsequent waypoint.

In addition, a magnitude of a velocity at a target waypoint is determined according to an interior angle of a trajectory at the target waypoint.

When the angle is large, the velocity becomes fast, or vice versa.

When an Euclidean distance between a robot location and a location of a target waypoint or between a location of the target waypoint and a location of a subsequent waypoint is smaller than D, a magnitude of a velocity of the current target waypoint is set proportional to the distance in order to not oscillate near the waypoint.

In the forward trajectory calculation, when a safe timed configuration region $Q_n^{safe}(m)$ exists which is a space within a configuration region where collisions with static obstacles and dynamic obstacles are not present, a forward trajectory is calculated on the basis of a configuration value $q_n$ of the robot at a time index n and a safe timed configuration region $Q_n^{safe}(m)$ at a time index n.

When a set of configuration values where collision with static environmental obstacles such as wall is present is referred to as $Q^{env}$ and as "environmental obstacle configuration region" ($Q^{enc} \subset Q$, difference of sets obtained by subtracting the environmental obstacle configuration region $Q^{env}$ from the configuration region Q may be referred to as a "free static configuration region" $Q^{free}$.

The robot may predict a trajectory of each dynamic obstacle such as people and other robots on the basis of a tracking algorithm using sensor data.

Accordingly, when a set of configuration values that are predicted to collide with any dynamic obstacles such as people at a time index n is referred to as $Q_n^{obs}$ and to a dynamic obstacle space "($Q_n^{obs} \subset Q$), difference of sets obtained by subtracting the dynamic obstacle space ($Q_n^{obs}$ from the free static configuration region $Q^{free}$ may be referred to as a "free dynamic configuration region" $Q_n^{free}$.

In other words, the free dynamic configuration region $Q_n^{free}$ at a time index n may be a safe region where the robot does not collide with obstacles including dynamic obstacles and static obstacles at a time index n.

A motion of a robot system with an input value $u_n$ ($u_n \in U$) in an input space U at a time index n may be defined as below.

$$S_{n+1} = f(S_n, u_n)$$

Herein, f is a motion model function of a robot.

A state space S of the robot and an input space U of the robot are bounded, and thus robot motion is constrained which is referred to a motion constraint.

Environment detectors (sensors) detect and track obstacles on the basis of a sensory system using sensors, such as vision sensors or laser range finders (LRF), etc., and classify the same into static obstacles (environmental obstacles) and dynamic obstacles (non-environmental obstacles) to obtain $Q^{env}$ and $Q_n^{obs}$.

Global trajectory planner (global path planner) planning a trajectory by assigning a waypoint plans a sequence of waypoints and a target inside a free static configuration region $Q^{free}$.

At every time instant t=kT, k=0, 1, . . . , an algorithm plans a trajectory by using a reference input k.

By the above input, the robot passes through waypoints sequentially and arrive the target without any collision using both of $Q^{env}$ and $Q_n^{obs}$.

When a timed state value $s_n$ is given, a reachable state-time region at a time index n+m may be defined. Herein, a reachable timed configuration region may be also defined.

In order to plan a trajectory in real time, it is preferable to reduce an amount of calculation by approximating the reachable state-time region or timed configuration region.

It may be difficult to perform real time calculation, and thus the reachable state-time region or timed configuration region is calculated accurately and used.

In order to simplify the reachable region, the robot may be controlled for m time steps by using a uniform robot input value.

A reachable state-time region that is reachable by the uniform robot input value may be defined as below.

$$S_n(m) = \{S_{n+m} \in S | \forall u_n \in U, s_{n+m} = g(s_n, u_n, m)\}$$

Herein, g is an approximated motion model function of a robot.

Herein, a reachable timed configuration region that is reachable the uniform robot input value may be defined as below.

$$Q_n(m) = \{q_{n+m} \in Q \mid \forall u_n \in U, s_{n+m}$$
$$= g(s_n, u_n, m), s_{n+m} \in S\}$$

$S_n(m)$ and $Q_n(m)$ do not cover the whole actual reachable region, but computational load is very small rather than calculating the whole actual reachable region, and thus the same are useful for trajectory planning.

When a state value $s_n$ is given, a safe timed state space $S_n^{safe}(m)$ at a time index n+m may be defined as below.

$$S_n^{safe}(m) = S_n(m) \cap S_{n+m}^{free}, (n>0, m>0)$$

In addition, when a state value $s_n$ is given, a safe timed configuration region $Q_n^{safe}(m)$ at a time n+m may be defined as below.

$$Q_n^{safe}(m) = Q_n(m) \cap Q_{n+m}^{free}, (n>0, m>0)$$

$Q_n^{safe}(m)$ is planned within $S_n^{safe}(m)$, but using $Q_n^{safe}(m)$ may be enough by checking predicted collision and by check whether or not an available safe region exists.

When calculating the safe timed configuration region $Q_n^{safe}(m)$ of a backward trajectory at a current target waypoint, $Q_{n+m}^{free}$ is replaced with $Q^{free}$.

This is because, an actual time of $Q_{n+m}^{free}$ is not given, and thus data of dynamic obstacles is not obtained.

The driving control unit 630 controls the driving unit 200 according to a movement trajectory planned by the trajectory planning unit 620.

The control unit 600 of the autonomous driving cart according to an embodiment of the present invention controls the driving unit 200 to follow a leading subject when a distance with the same is greater than a specific distance, and to stop moving when the distance is equal to or smaller than the specific distance.

In other words, when a leading subject comes close to the autonomous driving cart, the control unit 600 stops moving the autonomous driving cart so that the leading subject (user) can easily insert or remove goods into/from the cart.

For example, the autonomous driving cart is controlled to follow while maintaining a distance of 1 m, and stop moving when the distance becomes within 1 m.

In other words, it is preferable for the autonomous driving cart is stopped when a leading subject (user) comes close to the cart to insert or remove goods into/from the storage unit 100.

The control unit 600 of the autonomous driving cart according to an embodiment of the present invention controls the driving unit 200 such that a direction of the sensor unit 300 turns toward a leading subject by turning at a location at which the cart has been stopped when a distance with the leading subject is equal to or smaller than a specific distance.

The sensor unit 300 may be installed in the front surface of the autonomous driving cart (storage unit 100), or may be installed toward a driving moving direction (straight forward direction) of the autonomous driving cart.

Herein, it is preferable that a direction of the autonomous driving is controlled by the control unit 600 so that the sensor unit 300 detects a leading subject.

In other words, the autonomous driving cart may be controlled to just turn around when the autonomous driving cart is not moving.

In the above, the example has been described by using a case where a direction of the autonomous driving cart is changed when the autonomous driving cart has stopped, but the present invention is not limited thereto. It is more preferable to control a direction of the autonomous driving cart to be changed while the autonomous driving cart is moving such that the sensor unit 300 detects the leading subject.

As shown in FIG. 3, the sensor unit 300 of the autonomous driving cart according to an embodiment of the present invention includes a sensor turning unit 310 for turning the sensor unit 300.

Herein, the control unit 600 controls a direction of the sensor unit 300 by turning the sensor turning unit 310 such that a leading subject exists within a predetermined range within a detection range of the sensor unit 300.

The sensor turning unit 310 is a component for turning the sensor unit 300, and is for responding an unexpected situation where a leading subject is not present within the detection range of the sensor unit 300 due to limits in operation of the driving unit 200.

In other words, even in a sudden movement of the leading subject the leading subject may be present within the detection range of the sensor unit 300 by controlling the sensor turning unit 310.

Herein, when the sensor turning unit 310 is turned, the control unit 600 controls the driving unit 200 such that the front surface of the autonomous driving cart turns toward the leading subject, and at the same time, controls the sensor turning unit 310 to recover an original state thereof.

In other words, a direction of the sensor unit 300 turns toward the leading subject, and then the front surface of the autonomous driving cart is controlled to turn toward the leading subject slowly.

Accordingly, a situation where the leading subject is not present within a detection range of the sensor unit 300 due to limitation in operation of the driving unit 200 can be prevented, and at the same time, the driving unit 200 can be smoothly controlled so that an overload is not applied thereto.

The sensor turning unit 310 may turn the sensor unit 300 described above while the autonomous driving cart is moving.

As shown in FIG. 3, the sensor unit 300 of the autonomous driving cart according to an embodiment of the present invention includes a sensor turning unit 310 for turning the sensor unit 300.

Herein, the control unit 600 controls the driving unit 200 such that a direction of the sensor unit turns toward the leading subject by turning the sensor unit 300 at a location where the autonomous driving cart has stopped moving when a distance with the leading subject is equal to or smaller than a specific distance. However, when the leading subject is expected to be out of a detection range of the sensor unit 300, the control unit 600 turns the sensor turning unit 310 so that the direction of the sensor unit 300 turns toward the leading subject.

The sensor turning unit 310 is a configuration for turning the sensor unit 300, and is for responding an expected situation where the leading subject is not present within a detection range of the sensor unit 300 due to limitation in operation of the driving unit 200.

In other words, even in a sudden movement of the leading subject, the leading subject may be present within the detection range of the sensor unit 300 by turning the sensor turning unit 310.

The above situation generally occurs when the autonomous driving cart has stopped moving. When the leading subject is expected to be out of the detection range of the sensor unit 300, the sensor turning unit 310 is turned first so that a direction of the sensor unit 300 turns toward the leading subject, and then the autonomous driving cart is turned by the driving unit 200.

Describing in detail while assuming that the sensor turning unit 310 is turned, and then the leading subject has stopped moving, as the autonomous driving cart is turned by the driving unit 200, in association thereto, the sensor turning unit 310 is reverse-turned (recovering an original state), and thus finally, a direction of the autonomous driving cart and a direction of the sensor unit 300 are matched.

In other words, when the sensor turning unit 310 is turned, the control unit 600 controls the driving unit 200 such that the front surface of the autonomous driving cart turns toward the leading subject, and the same time, controls the sensor turning unit 310 to recover an original state thereof.

In other words, a direction of the sensor unit 300 is controlled to turn toward the leading subject always, and the front surface of the autonomous driving cart is controlled to turn toward for the leading subject slowly.

That is, the direction of the sensor unit 300 and the front surface of the autonomous driving cart (storage unit 100) are turned toward the leading subject. Herein, the direction of the sensor unit 300 is turned toward the leading subject first, and then the front surface of the autonomous driving cart (storage unit 100) is turned toward the leading subject in an appropriate manner of the driving environment (environment of the driving unit 200) of the autonomous driving cart.

In other words, after the direction of the sensor unit 300 is turned toward the leading subject, the autonomous driving cart (storage unit 100) is turned toward the leading subject and the sensor unit 300 returns to an original state thereof.

Accordingly, a situation where the leading subject is not present within a detection range of sensor unit 300 due to limitation in operation of the driving unit 200 can be prevented, and at the same time, the driving unit 200 can be smoothly controlled so that an overload is not applied thereto.

Controlling the sensor unit 300 that is turned by the sensor turning unit 310 and a body (storage unit 100) of the autonomous driving cart by will be described in detail by using a global coordinate system as an example.

The control unit 600 calculates a target heading angle of the autonomous driving cart and a target turning angle of the sensor unit 300 whenever a posture of the autonomous driving cart or an estimated location of the leading subject (user) (hereinafter, object) is updated, and controls a heading angle of the autonomous driving cart (hereinafter, cart) and a turning angle of the sensor unit 300 to become the calculated target values, respectively.

Describing with reference to FIG. 5, a global coordinate system is a coordinate system that becomes a reference for the entire system. Posture information of the cart, $p_r^g(x_r^g, y_r^g, \theta_r^g)$, is given on the basis of the corresponding coordinate system, and connects a coordinate system of the cart and the global coordinate system. In addition, a location of the object, $q_0^g(x_0^g, y_0^g)$, may be given on the basis of the global coordinate system.

Describing with reference to FIG. 6, a coordinate system of the cart is a coordinate system where, on the basis of the cart, a front side of the cart becomes an x-axis, a left side of the cart becomes a y-axis, and an upper side of the cart becomes a z-axis. Posture information of the sensor unit 300, $p_c^r(x_c^r, y_c^r, \theta_c^r)$, is given on the basis of the corresponding coordinate system, and may connect the coordinate system of the cart and a coordinate system of the sensor unit 300.

Describing with reference to FIG. 7, a coordinate system of the sensor unit 300 is a coordinate system in which a direction where an axial angle becomes 0 radian becomes an x-axis, and a direction where an axial angle becomes 90 radian becomes a y-axis on the basis of the center of the turning axis of the sensor unit 300 as the origin, and an upper side of the sensor unit becomes a z-axis. In the corresponding coordinate system, a location of the object is represented as $q_0^c(x_0^c, y_0^c)$, and a target turning angle $\psi_d$ of the sensor unit 300 may be calculated.

A target heading angle $\theta_d$ of the cart is newly calculated whenever a cart posture $p_r^g$, or a user estimation location $q_0^g$ is newly updated. The control unit 600 of the cart may control such that a heading angle $\theta_r^g$ of the cart posture $p_r^g$ becomes the target heading angle $\theta_d$ of the cart by using the equation below.

$\theta_d = \mathrm{atan}\, 2(y_0^g - y_r^g, x_0^g - x_r^g)$

The target turning angle $\psi_d$ of the sensor unit 300 is newly calculated whenever the cart posture $p_r^g$ or user estimated location $q_0^g$ is newly updated. The target turning angle of the sensor unit 300 is a turning angle on the basis of the coordinate system of the sensor unit 300, and thus the user estimated location $q_0^g$ is calculated by transforming the same into the coordinate system of the sensor unit 300. The control unit 600 controls the turning angle of the sensor unit 300 such that a current turning angle $\psi_c$ of the sensor unit 300 becomes the target turning angle $\psi_d$ of the sensor unit 300.

First, the user estimated location $q_0^g$ in the global coordinate system is transformed into the user estimated location $q_0^c$ in the coordinate system of the sensor unit 300. For performing transform of the coordinate system, by using the cart posture $p_r^g$ and information on an installation posture $p_c^r$ of the sensor unit 300, calculation may be performed by using the equation below.

$$[q_o^c\ 1]^T \leftarrow \begin{bmatrix} \cos(\theta_c^r) & -\sin(\theta_c^r) & x_c^r \\ \sin(\theta_c^r) & \cos(\theta_c^r) & y_c^r \\ 0 & 0 & 1 \end{bmatrix}^{-1} \cdot \begin{bmatrix} \cos(\theta_r^g) & -\sin(\theta_r^g) & x_r^g \\ \sin(\theta_r^g) & \cos(\theta_r^g) & y_r^g \\ 0 & 0 & 1 \end{bmatrix}^{-1} \cdot [q_0^g\ 1]^T$$

The target turning angle $\psi_d$ of the sensor unit 300 may be calculated from the calculated user estimated location $q_0^c$ in the coordinate system of the sensor unit 300 by using the equation below.

$\psi_d = \mathrm{atan}\, 2(y_0^c, x_0^c)$

As shown in FIG. 8, an autonomous driving cart according to another embodiment of the present invention may include a manipulation unit 700 receiving manipulation information from a user.

Herein, the control unit 600 stores (recognizes) information on a leading subject, follows the leading subject, and stops the moving cart according to the information on the user manipulation of the manipulation unit 700.

The manipulation unit 700 enables the user (leading subject) to manipulate the autonomous driving cart, and the control unit 600 controls to store (recognize) information on a leading subject, to follow the leading subject, and to stop the moving cart according to the manipulation information input to the manipulation unit 700.

The manipulation unit 700 may use a button, a joystick, a touch pad, etc. as an input means.

The autonomous driving cart according to an embodiment of the present invention is employed to be used by anyone where a leading subject is not predetermined. In addition, in order to enable the leading subject (user) not to carry an additional device while the cart follows the leading subject (user), information capable of determining the leading subject has to be stored (recognized) in advance. For the same, it is preferable to provide the above manipulation unit.

For example, when the user wants to use the autonomous driving cart, the user inputs information on a command for storing (recognizing) a leading subject by using the manipulation unit 700, and then the cart may automatically follow the user. Alternatively, when a follow command is input by using the manipulation unit 700, the cart may automatically follow the user.

In addition, while the cart follows the leading subject (user), when the leading subject (user) wants stop the operation of the autonomous driving cart for a while, the leading subject (user) inputs a stop command by using the manipulation unit 700 so that the cart stops following the leading subject (user) and stands by in place. Subsequently, when the user inputs a follow command by using the manipulation unit 700, the autonomous driving cart automatically follows the leading subject (user).

In addition, when the user has finished using the autonomous driving cart, the user inputs an operation stop command by using the manipulation unit 700 for another user, and the autonomous driving cart stops operation and stands by until a command for storing (recognizing) information on a leading subject of another user is input.

As shown in FIG. 8, the control unit 600 of the autonomous driving cart according to an embodiment of the present invention switches a driving mode according to manipulation information input through the manipulation unit 700.

The driving mode may include autonomous driving, responsive manual driving, non-responsive manual driving, etc.

In the autonomous driving, the autonomous driving cart follows a leading subject without additionally receiving a movement command.

In the responsive manual driving, the autonomous driving cart follows a leading subject by using a driving command through an input means of the manipulation unit 700, or follows the leading subject by automatically avoiding obstacles on the basis of information input to the sensor unit 300 so as not to collide with obstacles.

In the non-responsive manual driving, the autonomous driving cart follows a leading subject according to a driving command input through an input means of the manipulation unit 700.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An autonomous driving cart, the cart comprising:
    a storage (100) for storing goods;
    a driving unit (200) configured with a motor and wheels for driving, and coupled to the storage (100);
    a sensor unit (300) configured to obtain information on a surrounding environment including a leading subject, the sensor unit (300) being turnable independently from the storage (100); and
    controller (600) configured to control the driving unit (200) to follow the leading subject, wherein the controller (600) is configured to:
        control the driving unit (200) to follow the leading subject when a distance with the leading subject is greater than a specific distance, and to stop moving when the distance with the leading subject is equal to or smaller than the specific distance,
        control the driving unit (200) such that a direction of the sensor unit (300) turns towards the leading subject by turning the sensor unit (300) at a stopped location when the distance with the leading subject is equal to or smaller than the specific distance, and
        turn the sensor unit (300) towards the leading subject before the autonomous driving cart is turned when the leading subject is expected to be out of the detection range of the sensor unit (300),
    wherein as the autonomous driving cart is turned by the driving unit (200) toward the leading subject, the sensor unit (300) is turned in an opposite direction to a direction in which the autonomous driving cart is turned, such that a direction of the autonomous driving cart and a direction of the sensor unit (300) are matched.

2. The autonomous driving cart of claim 1, wherein the sensor unit (300) includes any one or a plurality of devices selected from a depth camera, a camera, an ultrasonic sensor, a vision sensor, and a distance sensor.

3. The autonomous driving cart of claim 1, wherein the controller (600) includes:
    an environment recognition unit (610) recognizing an environment including obstacles based on the information obtained from the sensor unit (300); and
    a trajectory planning unit (620) planning a movement trajectory to follow the leading subject while avoiding the obstacles recognized in the environment recognition unit (610),
    wherein the controller (600) controls the driving unit (200) according to the movement trajectory planned in the trajectory planning unit (620).

4. The autonomous driving cart of claim 1 further comprising: a user input receiving manipulation information from a user, wherein the controller (600) stores information on the leading subject, follows the leading subject, and stops moving the cart according to the manipulation information received via the user input.

5. The autonomous driving cart of claim 4, wherein the controller (600) switches a driving mode according to the manipulation information received via the user input.

6. The autonomous driving cart of claim 4, wherein the user input includes any one of a button, a joystick, or a touch pad.

* * * * *